(12) United States Patent
Kusuda

(10) Patent No.: US 9,201,238 B2
(45) Date of Patent: Dec. 1, 2015

(54) OPTICAL SCANNING DEVICE

(71) Applicant: Shinya Kusuda, Nagoya (JP)

(72) Inventor: Shinya Kusuda, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 193 days.

(21) Appl. No.: 14/099,556

(22) Filed: Dec. 6, 2013

(65) Prior Publication Data

US 2014/0158874 A1    Jun. 12, 2014

(30) Foreign Application Priority Data

Dec. 7, 2012    (JP) ................................ 2012-268047

(51) Int. Cl.
*G02B 26/10*    (2006.01)
*G02B 26/12*    (2006.01)

(52) U.S. Cl.
CPC .............. *G02B 26/10* (2013.01); *G02B 26/125* (2013.01)

(58) Field of Classification Search
CPC ...... G02B 26/10; G02B 26/125; G01J 1/0407
USPC .................... 250/234, 239; 359/201.2, 224
See application file for complete search history.

(56) References Cited

U.S. PATENT DOCUMENTS

| 5,579,295 | A | * | 11/1996 | Van Rosmalen | ............... 720/683 |
| 5,737,007 | A | * | 4/1998 | Kashima et al. | ............... 347/250 |
| 2005/0179972 | A1 | * | 8/2005 | Nomura et al. | ............... 359/196 |
| 2005/0179974 | A1 | * | 8/2005 | Nomura et al. | ............... 359/204 |

FOREIGN PATENT DOCUMENTS

| JP | 2005-215494 A | 8/2005 |
| JP | 2008-089989 A | 4/2008 |

* cited by examiner

*Primary Examiner* — Seung C Sohn
(74) *Attorney, Agent, or Firm* — Merchant & Gould PC

(57) ABSTRACT

In an optical scanning device, a lower frame includes a first wall contacting an optical element, a second wall connected to a second-wall connecting portion of the first wall, a third wall connected to a third-wall connecting portion of the first wall, and a biasing member having a first end contacting the optical element and a second end supported by a scanner frame to press the optical element against the first wall. The second wall extends in a traverse direction angled with respect to a direction in which the first wall extends. The third wall extends in a direction facing away from an optical element side of the first wall on which the optical element is located. The optical element is in contact with at least one position of the first wall which position is between the second-wall connecting position and the third-wall connecting position.

19 Claims, 8 Drawing Sheets

OPTICAL SCANNING DEVICE

CROSS-REFERENCE TO RELATED APPLICATION(S)

This application claims priority from Japanese Patent Application No. 2012-268047 filed on Dec. 7, 2012, the disclosure of which is incorporated herein by reference in its entirety.

TECHNICAL FIELD

The present invention relates to an optical scanning device.

BACKGROUND ART

In the realm of optical systems for use in an image forming apparatus, a typical optical scanning device known in the art comprises a retaining wall and a biasing member (e.g., leaf spring) configured to press an optical element such as an f-theta lens against the retaining wall. This apparatus is configured to support the optical element by holding the optical element between the retaining wall and the biasing member.

The biasing member pressing the optical element against the retaining wall might cause the retaining wall to be deformed by the pressing force of the biasing member. The deformation of the retaining wall would possibly deprive the optical element of proper support for its precise positioning.

It would be desirable to provide an optical scanning device in which the optical element can be supported precisely in position.

SUMMARY

In one aspect of the present invention, an optical scanning device comprises a light source, a deflector configured to deflect a light beam derived from light of the light source in a main scanning direction, a scanning optical system configured to cause the light beam deflected by the deflector to be focused on a target surface to form an image thereon, a scanner frame, and a biasing member. The scanning optical system includes an elongate optical element. The scanner frame includes a lower frame. The lower frame includes a first wall, a second wall, a third wall, and a base wall which supports the deflector and on which the first, second and third walls are provided. The first wall contacts the optical element, the second wall is connected to a second-wall connecting position of the first wall, and the third wall is connected to a third-wall connecting position of the first wall. The biasing member has a first end contacting the optical element and a second end supported by the scanner frame. The biasing member presses the optical element against the first wall. The second wall extends in a traverse direction angled with respect to a direction in which the first wall extends, the third wall extends in a direction facing away from an optical element side of the first wall that is one of two sides of the first wall on which the optical element is located, and the optical element is in contact with at least one position of the first wall which position is between the second-wall connecting position and the third-wall connecting position.

BRIEF DESCRIPTION OF THE DRAWINGS

The above aspect, its advantages and further features of the present invention will become more apparent by describing in detail illustrative, non-limiting embodiments thereof with reference to the accompanying drawings, in which.

DESCRIPTION OF EMBODIMENTS

A detailed description will be given of an illustrative, non-limiting embodiment of the present invention with reference made to the drawings where appropriate. In the following description, a general setup of an optical scanning device according to one embodiment of the present invention will be described briefly with reference to relevant figures at the outset, and then a specific configuration will be described in detail.

Figure 1:
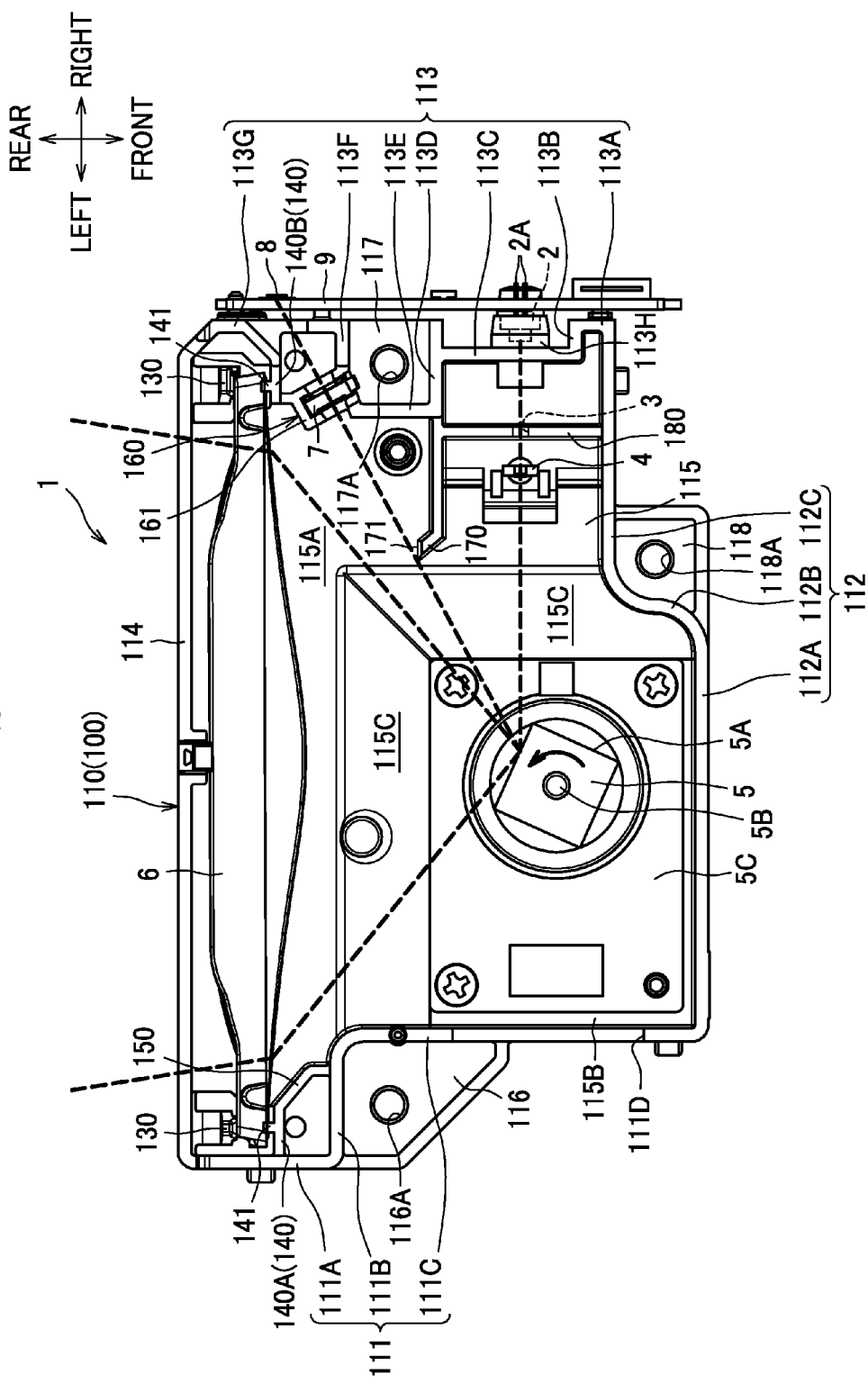
FIG. 1 is a top view of an optical scanning device according to an illustrative, non-limiting embodiment.

In the following description, the rightward, leftward, upward and downward directions in FIG. 1 are designated by "right", "left", "rear" and "front", respectively for the purpose of explanation. Similarly, it is understood that the front and rear sides of the drawing sheet of FIG. 1 correspond to "upper" and "lower" sides, respectively, of the illustrated apparatus.

As shown in FIG. 1, an optical scanning device 1 according to one embodiment includes a scanner frame 100 made of resin, and several components provided in this scanner frame 100 which include a semiconductor laser 2 as an example of a light source, an aperture stop 3, a coupling lens 4, a polygon mirror 5 as an example of a deflector, an f-theta lens (fθ lens) 6 as an example of an optical element (scanning optical system), a beam detect (BD) lens 7 as an example of a second optical element, a BD sensor 8 as an example of a photosensor, and a circuit board 9. A detailed structure of the scanner frame 100 will be described later in detail.

The semiconductor laser 2 is a device configured to emit light (light beam) in the form of a slightly divergent laser beam. The light-emitting elements of the semiconductor laser 2 are configured to turn on and off with timing as modulated in accordance with an image to be formed on a target scan surface under control of a controller (not shown). The semiconductor laser 2 includes terminals 2A connected to the circuit board 9. The ends of the terminals 2A protrude through the circuit board 9 to the right.

The aperture stop 3 is a part having an opening that determines the breadth in the sub-scanning direction of the laser beam emitted from the semiconductor laser 2. This aperture stop 3 is provided as an integral part of the scanner frame 100, specifically, by a hole formed in a partition wall 180 that will be described later.

The coupling lens 4 is provided between the semiconductor laser 2 and the polygon mirror 5, and configured to convert the light beam traveling from the semiconductor laser 2 through the aperture stop 3 into a light beam slightly convergent in a main scanning direction (i.e., the direction of deflection of the light beam, to the left and to the right in the drawing sheet of FIG. 1 with respect to a direction of travel of the light beam, which is caused by the polygon mirror 5), and focused on or near a specular surface 5A of the polygon mirror 5 in a sub-scanning direction (i.e., the direction perpendicular to the main scanning direction and perpendicular to the drawing sheet of FIG. 1). The coupling lens 4 is adhered directly to the scanner frame 100 with an adhesive.

The polygon mirror 5 has a plurality of specular surfaces 5A disposed equidistantly from a rotation axis (shaft 5B). The polygon mirror 5 having four specular surfaces 5A is illustrated in FIG. 1 by way of example. The polygon mirror 5 spins at a constant rotational speed about the rotation axis (5B) and deflects the light beam having passed through the coupling lens 4 in the main scanning direction.

The f-theta lens 6 is an elongate lens element configured to convert the light beam reflected and deflected by the polygon mirror 5 into a spot-like image to be focused on the target scan surface and to correct an optical face tangle error of each specular surface 5A. The f-theta lens 6 has f-theta characteristics such that the light beam deflected at a constant angular velocity by the polygon mirror 5 is converted into a light beam that scans the target scan surface at a constant linear velocity.

The BD lens 7 is disposed in front of the right end portion of the f-theta lens 6 and configured to direct the light beam deflected by the polygon mirror 5 to the BD sensor 8.

The BD sensor 8 is disposed on the circuit board 9 and configured to receive the light beam having passed through the BD lens 7 to produce a detection signal.

The circuit board 9 is a board in which a circuit (not shown) for supplying electric power to the semiconductor laser 2 is provided. The circuit board 9 is fastened by screws to the right side of the scanner frame 100.

In the optical scanning device 1, a light beam formulated based upon image data is emitted from the semiconductor laser 2, passes through the coupling lens 4, the polygon mirror 5 and the f-theta lens 6 in this order, and rapidly scans the target scan surface.

Structure of Scanner Frame

A structure of the scanner frame 100 will now be described in detail.

Figure 4A:
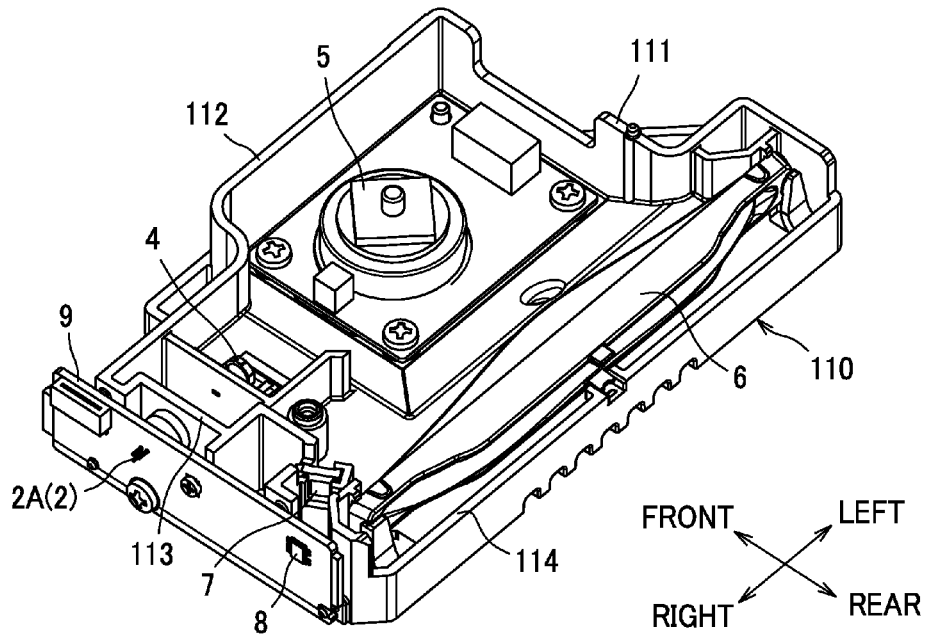
FIG. 4A is a perspective view of a lower frame that is a lower half of a scanner frame with no upper frame attached thereto.
Figure 4B:
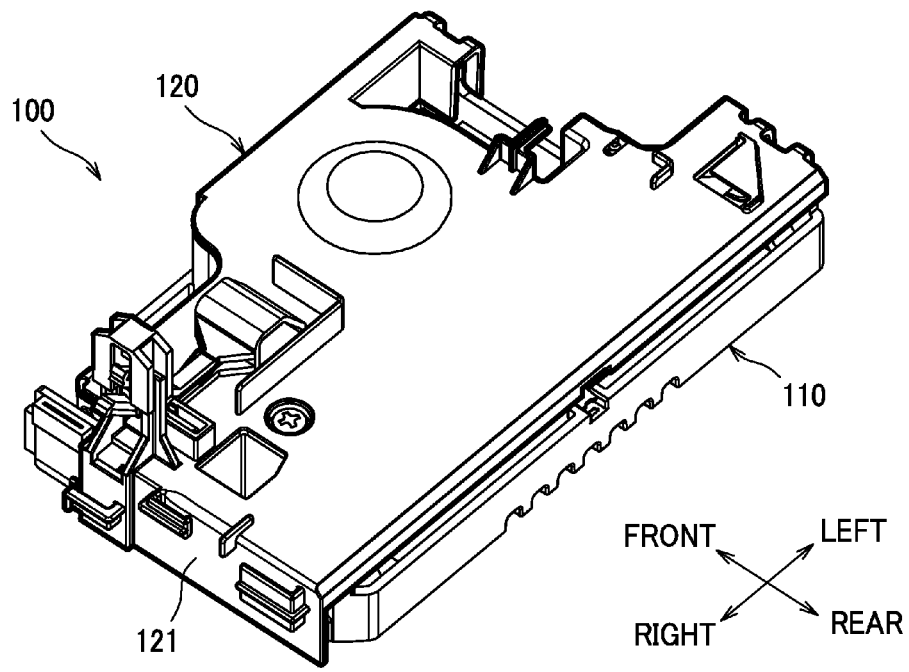
FIG. 4B is a perspective view of the scanner frame having a lower frame and an upper frame attached to the lower frame.

The scanner frame 100 is configured as a housing of the optical scanning device 1, and includes a lower frame 110 and an upper frame 120 (see FIG. 4B).

Figure 2:
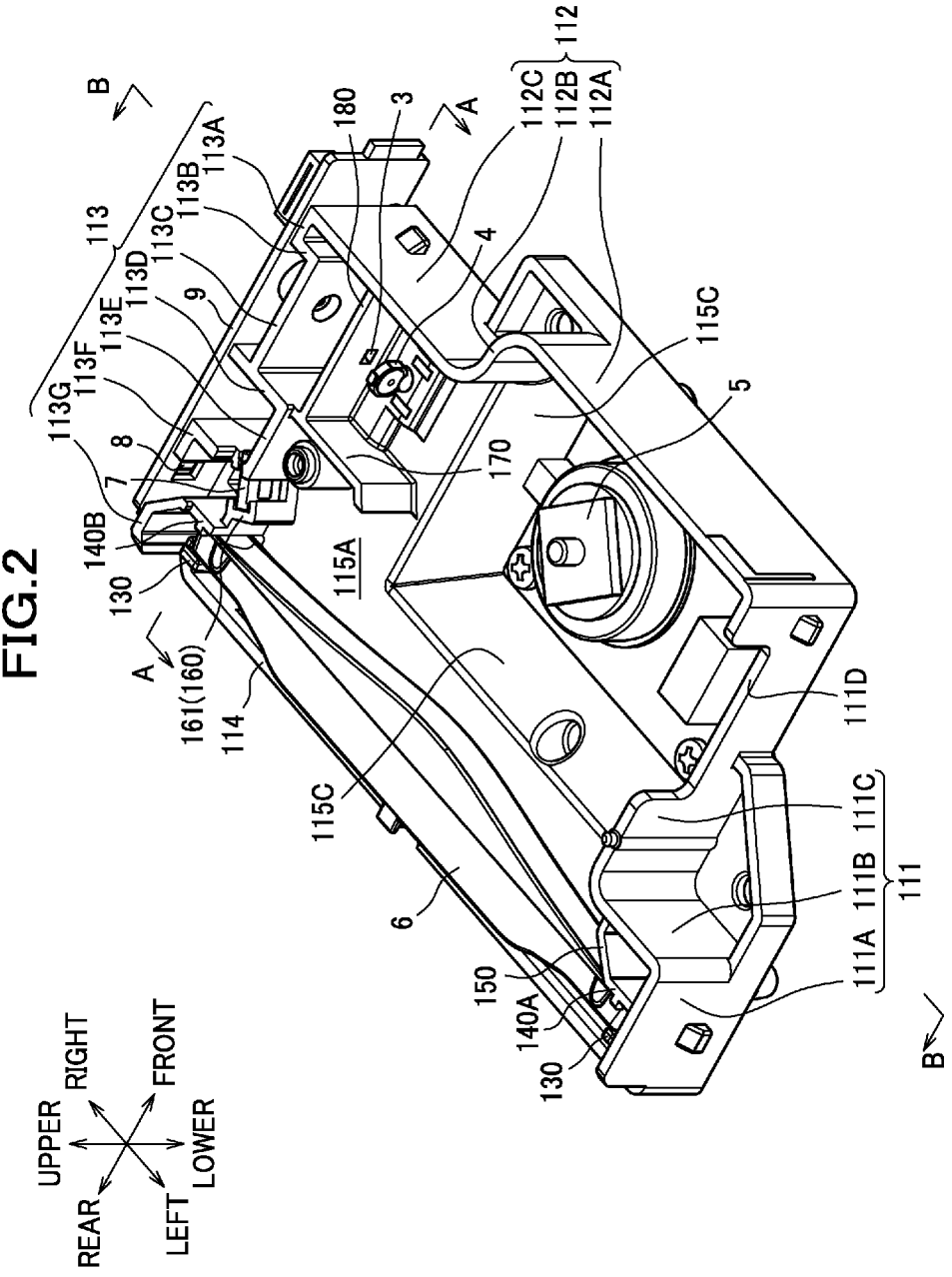
FIG. 2 is a perspective view of the optical scanning device.

The lower frame 110 is, as shown in FIGS. 1 and 2, shaped like a box with an open top, and includes a left exterior wall 111, a front exterior wall 112, a right exterior wall 113, a rear exterior wall 114, and a base wall 115 on which these walls 111, 112, 113, 114 are erected. The left exterior wall 111 is configured to define a left side (exterior wall) of the lower frame 110. The front exterior wall 112 is configured to define a front side (exterior wall) of the lower frame 110. The right exterior wall 113 is configured to define a right side (exterior wall) of the lower frame 110. The rear exterior wall 114 is configured to define a rear side (exterior wall) of the lower frame 110. The base wall 115 is configured to define a bottom of the box-like lower frame 110.

The left exterior wall 111 includes a first left exterior wall 111A as an example of a second wall which extends frontward from the left rear end portion of the base wall 115, a second left exterior wall 111B as an example of a fourth wall which extends rightward from the front end of the first left exterior wall 111A, and a third left exterior wall 111C which extends frontward from the right end of the second left exterior wall 111B. The first left exterior wall 111A and the second left exterior wall 111B will be described later in detail.

The third left exterior wall 111C is provided to extend over an approximately two-third part (from the front edge) of the left exterior wall 111, and has an opening 111D at a position where a line extending from the semiconductor laser 2 through the coupling lens 4 intersects with the third left exterior wall 111C.

The front exterior wall 112 includes a first front exterior wall 112A which extends rightward from the front end of the third left exterior wall 111C, a second front exterior wall 112B which extends rearward from the right end of the first front exterior wall 112A, and a third front exterior wall 112C which extends rightward from the rear end of the second front exterior wall 112B.

The right exterior wall 113 includes a first right exterior wall 113A which extends in some measure rearward from the right end of the third front exterior wall 112C, a second right exterior wall 113B which extends in some measure leftward from the rear end of the first right exterior wall 113A, a third right exterior wall 113C which extends rearward from the left end of the second right exterior wall 113B, a fourth right exterior wall 113D which extends leftward from the rear end of the third right exterior wall 113C, a fifth right exterior wall 113E which extends rearward from the left end of the fourth right exterior wall 113D, a sixth right exterior wall 113F which extends rightward from the rear end of the fifth right exterior wall 113E, and a seventh right exterior wall 113G (second wall) which extends rearward from the left end of a right first retaining wall 140B that will be described later. The seventh right exterior wall 113G will be described later in detail.

The third right exterior wall 113C is provided with a light source holder 113H configured to hold the semiconductor laser 2.

The left end portion of the sixth right exterior wall 113F includes a lower portion which allows the BD lens 7 to be held therein.

The rear exterior wall 114 extends from the rear end of the seventh right exterior wall 113G to the first left exterior wall 111A, and is configured to have a lower wall height along the length in the left-right direction, that is, lower than those of the left exterior wall 111, the front exterior wall 112 and the right exterior wall 113. This configuration allows a light beam having passed through the f-theta lens 6 to pass over the rear exterior wall 114.

The base wall 115 has a first support surface 115A, a second support surface 115B, and two sloped surfaces 115C which connect the first and second support surfaces 115A, 115B.

The first support surface 115A is a surface which supports the coupling lens 4, the f-theta lens 6 and other parts. The first support surface 115A is shaped substantially like a letter L having two segments extending leftward and frontward as viewed from above. From outer edges of the first support surface 115A, the first left exterior wall 111A, the second left exterior wall 111B, the third front exterior wall 112C, the right exterior wall 113 and the rear exterior wall 114 extend upward.

On the first support surface 115A, a pair of leaf springs 130 as an example of a biasing member is provided at right and left rear corner areas of the first support surface 115A. Other walls provided on the first support surface 115A include: a pair of first retaining walls 140 as an example of a first wall; a reinforcing wall 150 as an example of a third wall; a second retaining wall 160 as another example of the third wall; a shielding wall 170; and a partition wall 180. Each first retaining wall 140 is provided at one side of the f-theta lens 6, which is the side opposite to that on which the corresponding (left or right) leaf spring 130 is provided. The reinforcing wall 150 is provided at the right side of the left first retaining wall 140A. The second retaining wall 160 is provided at the left side of the right first retaining wall 140B. The first retaining wall 140, the reinforcing wall 150 and the second retaining wall 160 will be described later in detail.

Figure 3:
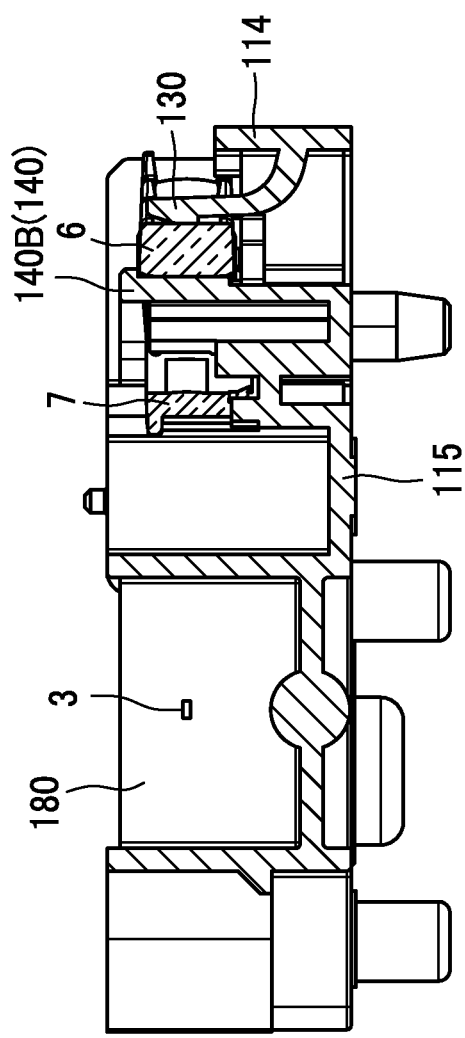
FIG. 3 is a sectional view taken along line A-A of FIG. 2.

The leaf spring 130 is a member configured to press the f-theta lens 6 against the first retaining wall 140. As shown in FIG. 3, an upper end portion (first end) of the leaf spring 130 is disposed to contact the f-theta lens 6, and a lower end portion (second end) of the leaf spring 130 is provided integrally with the rear exterior wall 114 and thus supported by the rear exterior wall 114 (lower frame 110). It is to be understood that the leaf spring 130 may be a discrete part provided separately from the lower frame 110.

Referring back to FIGS. 1 and 2, the shielding wall 170 is shown which is configured to intercept a light beam deflected farther frontward than the light beam directed to the BD sensor 8. The shielding wall 170 extends leftward from the left end of the fourth right exterior wall 113D and is bent obliquely, extending in some measure in a rearward-and-leftward direction. An end face 171 of this obliquely extending portion of the shielding wall 170 is shaped to retreat frontward farther than the path of a light beam passing in the vicinity of the end face 171. With this configuration, reflection of a light beam at the shielding wall 170 toward the f-theta lens 6 can be prevented.

The partition wall 180 is configured to separate the semiconductor laser 2 and the coupling lens 4. The partition wall 180 extends frontward from the third front exterior wall 112C to the shielding wall 170. This partition wall 180 has a through hole which allows light coming from the semiconductor laser 2 to pass toward the coupling lens 4, and thus serves as an aperture stop 3 (see FIG. 3).

The second support surface 115B supports the polygon mirror 5. The first support surface 115B is provided in a position shifted in a downward direction from the first support surface 115A. The second support surface 115B has a rectangular shape of which two sides adjoins the third left exterior wall 111C and the first front exterior wall 112A, respectively, and the remaining two sides are joined to the two sloped surfaces 115C. To the second support surface 115B, a mount plate 5C on which the polygon mirror 5 and other parts are arranged is fixed with a plurality of screws (designation by reference characters are omitted).

The lower frame 110 further includes a first fixing portion 116, a second fixing portion 117 and a third fixing portion 118. The first fixing portion 116 is provided outside the second left exterior wall 111B and the third left exterior wall 111C. The second fixing portion 117 is provided inside and surrounded by the fourth right exterior wall 113D, the fifth right exterior wall 113E and the sixth right exterior wall 113F.

The third fixing portion 118 is provided outside the second front exterior wall 112B and the third front exterior wall 112C.

The first, second and third fixing portions 116, 117, 118 have first, second and third screw holes 116A, 117A, 118A for the screws (not shown) to be inserted therein. At these fixing portions 116, 117, 118, the lower frame 110 is fixed to a body frame of an image forming apparatus (not shown) to which the optical scanning device 1 is installed.

The first fixing portion 116 and the second fixing portion 117 are arranged such that a distance from the first screw hole 116A to the left first retaining wall 140A and a distance from the second screw hole 117A to the right first retaining wall 140B are substantially equal to each other. With this arrangement, in which the first screw hole 116A and the second screw hole 117A are located as such, the distortion of the f-theta lens 6 can be suppressed irrespective of change in temperature.

The upper frame 120 is, as shown in FIG. 4B, contoured to cover the open top of the box-like lower frame 110 so that the contour of the upper frame 120 extends along the upper ends of the left exterior wall 111, the front exterior wall 112, the right exterior wall 113 and the rear exterior wall 114. The upper frame 120 includes a cover part 121 extending downward at the right side (shown at the left side in FIG. 4B) of the upper frame 120 so as to overlap the outside of the right outer wall 113 of the lower frame 110.

The cover part 121 is configured to cover the terminals 2A of the semiconductor laser 2 protruding from the circuit board 9 to the right (to the left in FIG. 4A)

Assuming that an alternative embodiment in which the upper frame 120 fails to cover the terminals 2A of the semiconductor laser 2 were implemented, the terminals 2A would be exposed to outside through the circuit board 9 as shown in FIG. 4A and thus become susceptible to static, physical or other damages. With this in view, the optical scanning device 1 according to the present embodiment is configured to provide the upper frame 120 with the cover part 121 with which the terminals 2A are covered as shown in FIG. 4B, so that the terminals 2A of the semiconductor laser 2 can be protected.

Structures of First, Second, Third and Fourth Walls

The next discussion focuses on the walls disposed near two end portions of the f-theta lens 6 in the left-right direction.

Two first retaining walls 140 are erected on the base wall 115, side by side in the left-right direction (longitudinal direction of the f-theta lens 6), as shown in FIGS. 1 and 2. Each of the first retaining walls 140 thus provided in pair includes an abutting portion 141 which is provided substantially in a center thereof and configured to abut on (be in contact with) a corresponding (left or right) end portion of the f-theta lens 6.

The abutting portion 141 is a portion protruding rearward from the rear side of each first retaining wall 140. The abutting portion 141 provided at the left first retaining wall 140A is located in a position between a connecting position in which the first retaining wall 140A is connected to the first left exterior wall 111A and a connecting position in which the first retaining wall 140A is connected to the reinforcing wall 150. The abutting portion 141 provided at the right first retaining wall 140B is located in a position between a connecting position in which the first retaining wall 140B is connected to the seventh right exterior wall 113G and a connecting position in which the first retaining wall 140B is connected to the second retaining wall 160.

The first left exterior wall 111A is provided on the left end of the left first retaining wall 140A and extends therefrom frontward and rearward (in a traverse direction angled with respect to a direction in which the first retaining wall 140A extends).

The seventh right exterior wall 113G extends from the right end of the right first retaining wall 140B obliquely in a rearward-and-rightward direction (in a traverse direction angled with respect to a direction in which the first retaining wall 140B extends) and is bent to extend rearward.

The reinforcing wall 150 is provided (erected) on the first support surface 115A. The reinforcing wall 150 extends from the right end of the left first retaining wall 140A obliquely in a frontward-and-rightward direction (i.e., in a direction facing away from an optical element side of the first retaining wall 140A that is one of two sides of the first retaining wall 140A on which the f-theta lens 6 is located), and is bent and extends to be connected to the second left exterior wall 111B.

The second retaining wall 160 is provided (erected) on the first support surface 115A. The second retaining wall 160 extends from the left end of the right first retaining wall 140B frontward (i.e., in a direction facing away from an optical element side of the first retaining wall 140B that is one of two sides of the first retaining wall 140B on which the f-theta lens 6 is located) and extends to be connected to a holding portion 161 configured to hold the BD lens 7.

The holding portion 161 is shaped like a letter U which opens in a frontward-and-rightward oblique direction, and configured to hold and support the BD lens 7. In this way, the BD lens 7 can be supported by the second retaining wall 160, and thus the structure of the scanner frame 100 can be simplified.

The second left exterior wall 111B is configured to connect the first left exterior wall 111A and the reinforcing wall 150, and located in a position spaced apart from the left first retaining wall 140.

In the optical scanning device 1 configured as described above, the f-theta lens 6 is supported by the leaf springs 130 and the first retaining walls 140. Assuming, for example, that neither of the reinforcing wall 150 nor the second retaining wall 160 are provided, the first retaining wall 140 is supported only at one end (the left or right end) thereof. With this configuration, the biasing force applied by the leaf spring 130 to the f-theta lens 6 causes the f-theta lens 6 to be pressed against the first retaining wall 140, and the first retaining wall 140 would possibly be caused to deform by the biasing force of the leaf spring 130 with the result that the f-theta lens 6 could not be supported precisely in position at worst.

With this in view, the optical scanning device 1 according to the present embodiment is configured such that the left first retaining wall 140A is in contact with the f-theta lens 6 at a position between two connecting positions thereof: the connecting position in which the first retaining wall 140A is connected to the first left exterior wall 111A and the connecting position in which the first retaining wall 140A is connected to the reinforcing wall 150, while the right first retaining wall 140B is in contact with the f-theta lens 6 at a position between two connecting positions thereof: the connecting position in which the first retaining wall 140B is connected to the second retaining wall 160 and the connecting position in which the first retaining wall 140B is connected to the seventh right exterior wall 113G.

With this configuration, the biasing force applied by the leaf spring 130 to each end portion of the f-theta lens 6 and received by the first retaining wall 140 can be supported by two walls provided at the left and right ends of the first retaining wall 140. To be more specific, the left first retaining wall 140A can be supported at the both (left and right) ends by the first left exterior wall 111A and the reinforcing wall 150, and the right first retaining wall 140B can be supported at the both (left and right) ends by the second retaining wall 160 and the seventh right exterior wall 113G. Accordingly, the first retaining walls 140 can be enhanced in rigidity, so that deformation thereof can be prevented and the f-theta lens 6 can be supported precisely in position.

The second left exterior wall 111B is provided to connect the first left exterior wall 111A and the reinforcing wall 150. Moreover, this second left exterior wall 111B is located apart from the first retaining wall 140A. With these features, the first retaining wall 140A can be further enhanced in rigidity.

Furthermore, the first left exterior wall 111A, the second left exterior wall 111B and the seventh right exterior wall 113G are configured to constitute an exterior wall of the lower frame 110. Therefore, the rigidity of the first retaining wall 140 can be enhanced with a simple configuration. This also contributes to miniaturization of the optical scanning device 1.

Since the partition wall 180 is placed between the semiconductor laser 2 and the coupling lens 4, dust which could enter the inside of the lower frame 110 through the opening 111D of the third left exterior wall 111C or any other clearance can be prevented from entering the space between the partition wall 180 and the third right exterior wall 113C. Accordingly, the cover lens of the semiconductor laser 2 can be protected from becoming unclean.

Figure 5:
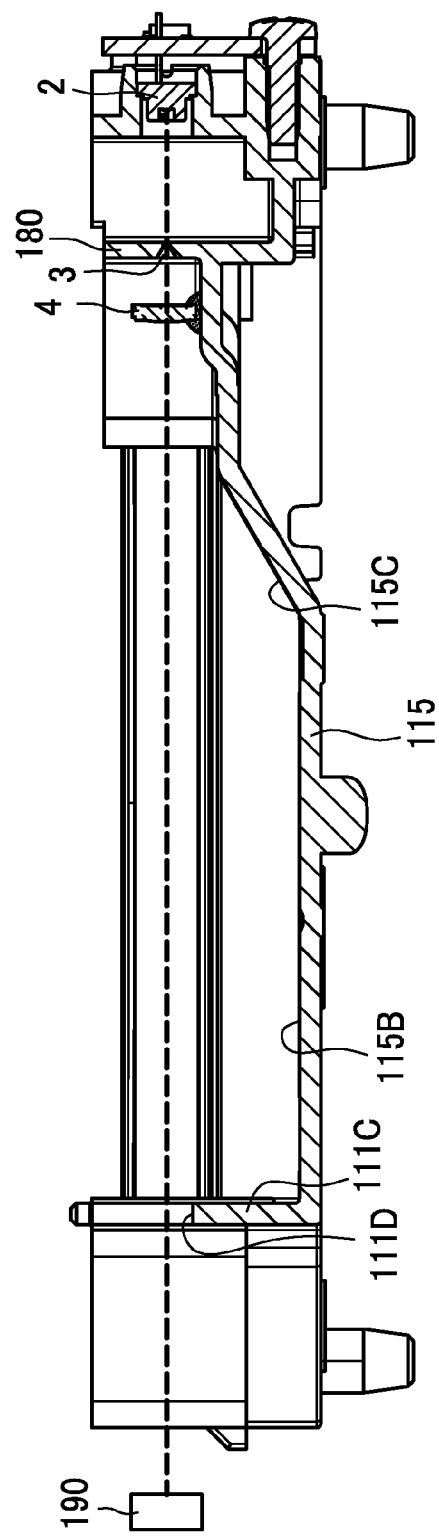
FIG. 5 is a sectional view taken along line B-B of FIG. 2 which shows the lower frame from which a polygon mirror is removed.

Since the third left exterior wall 111C located in such a position that a line extending from the semiconductor laser 2 through the coupling lens 4 intersects the third left exterior wall 111C has the opening 111D provided at a position where the line extending from the semiconductor laser 2 through the coupling lens 4 intersects with the third left exterior wall 111C, a light beam emitted from the semiconductor laser 2 before the polygon mirror 5 is set in place can be allowed to pass through the opening 111D, as shown in FIG. 5. Therefore, a test for the semiconductor laser 2 can be performed from outside (e.g., using an inspection device 190) with increased ease. Alternatively, when the inspection device 190 is set inside the scanner frame 100, the inspection device 190 can be easily placed inside the scanner frame 100 through the opening 111D.

Although the illustrative embodiment of the present invention has been described above, the present invention is not limited to the above-described embodiment. Various modifications and changes may be made to the specific structures and arrangement without departing from the scope of the present invention. In the following description, substantially the same elements as those of the above-described embodiment are designated by the same reference characters and a duplicate description will be omitted.

First Modified Embodiment

Figure 6A:
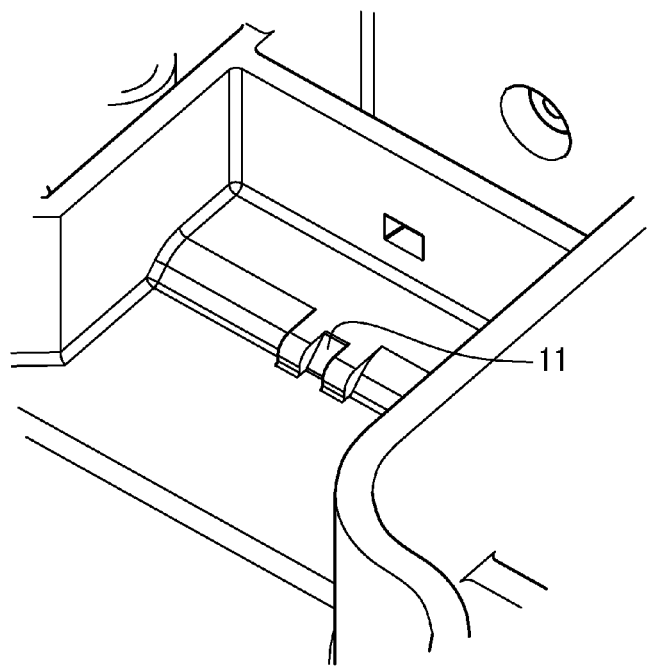
FIG. 6A is an enlarged perspective view of a coupling lens installation space with no coupling lens installed therein as implemented according to a first modified embodiment.
Figure 6B:
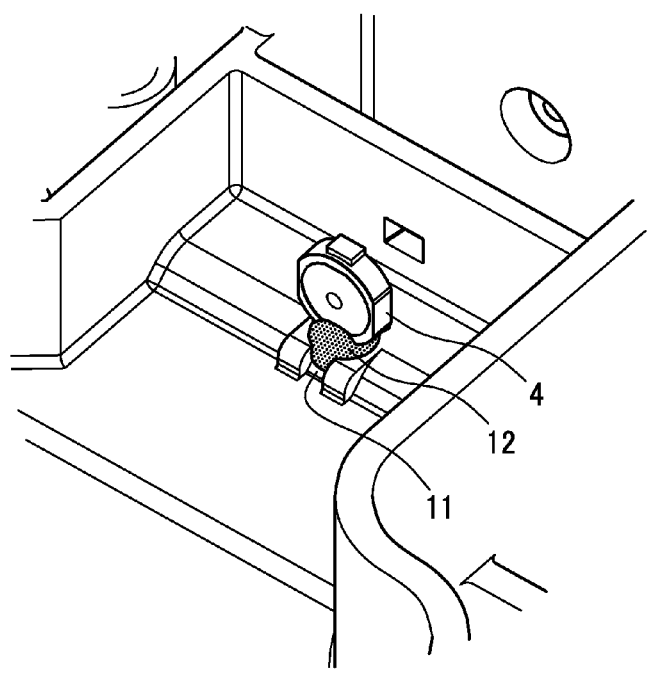
FIG. 6B is an enlarged perspective view of the coupling lens installation space in which a coupling lens is installed.
Figure 7:
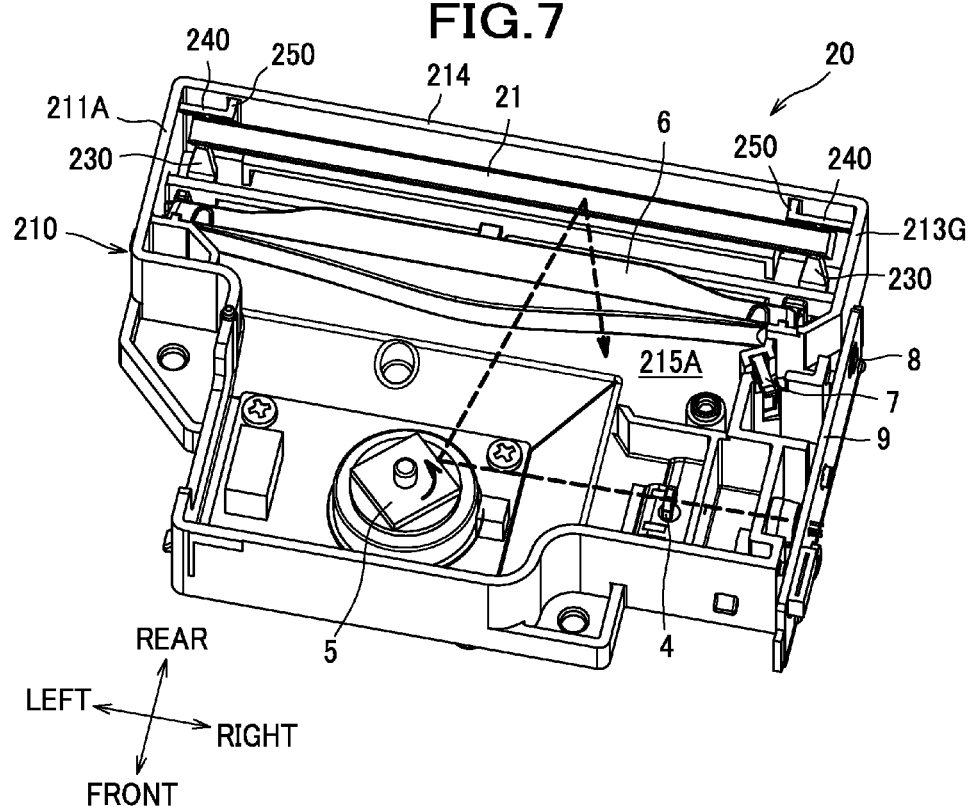
FIG. 7 is a perspective view of an optical scanning device as implemented according to a second modified embodiment.

In the above-described embodiment, the coupling lens 4 is fixed directly to a flat surface in the lower frame 110 (scanner frame 100) with an adhesive. A groove 11 may be provided in the lower frame 110 as shown in FIG. 6A, which makes it easier to have an adhesive retained in a desired position in the lower frame 110.

Second Modified Embodiment

In the above-described embodiment, the f-theta lens 6 is illustrated as an example of an optical element (scanning optical system) in the optical scanning device. The optical element consistent with the present invention may be a reflecting mirror 21 disposed behind the f-theta lens 6.

The optical scanning device 20 in this modified embodiment additionally includes a reflecting mirror 21 as an example of an elongate optical element, a pair of leaf springs 230 as an example of a biasing member, a pair of third retaining walls 240 as an example of a first wall, and a pair of second reinforcing walls 250 as an example of a third wall.

The reflecting mirror 21 is an element configured to reflect a light beam which has passed through the f-theta lens 6, so that the light beam which strikes the same changes its traveling direction and travels downward.

Each leaf spring 230 is configured to press the reflecting mirror 21 against the third retaining wall 240. An upper end portion (first end) of the leaf spring 230 contacts the reflecting mirror 21, and a lower end portion (second end) of the leaf spring 230 is supported by the first support surface 215A. Two leaf springs 230 are provided at the left and right end portions of the reflecting mirror 21.

Two third retaining walls 240 are provided side by side in the left-right direction and each configured to abut on a corresponding (left or right) end portion of the reflecting mirror 21. These two third retaining walls 240 thus provided in pair have their outer (left and right) end portions connected to the first left exterior wall 211A and the seventh right exterior wall 213G as an example of a second wall, respectively.

Each second reinforcing wall 250 extends from its inner (left or right) end portion of the corresponding third retaining wall 240 to the rear exterior wall 214.

The rear exterior wall 214 is configured to have the same height as those of the left exterior wall 211 and the right exterior wall 213.

In this optical scanning device 20, a light beam having passed through the f-theta lens 6 is reflected off the reflecting mirror 21, and swept over the target scan surface at high speeds.

With this configuration, as in the above-described embodiment, the rigidity of the third retaining wall 240 is enhanced, so that deformation thereof can be prevented and the reflecting mirror 21 can be supported precisely in position.

Third Modified Embodiment

Figure 8:
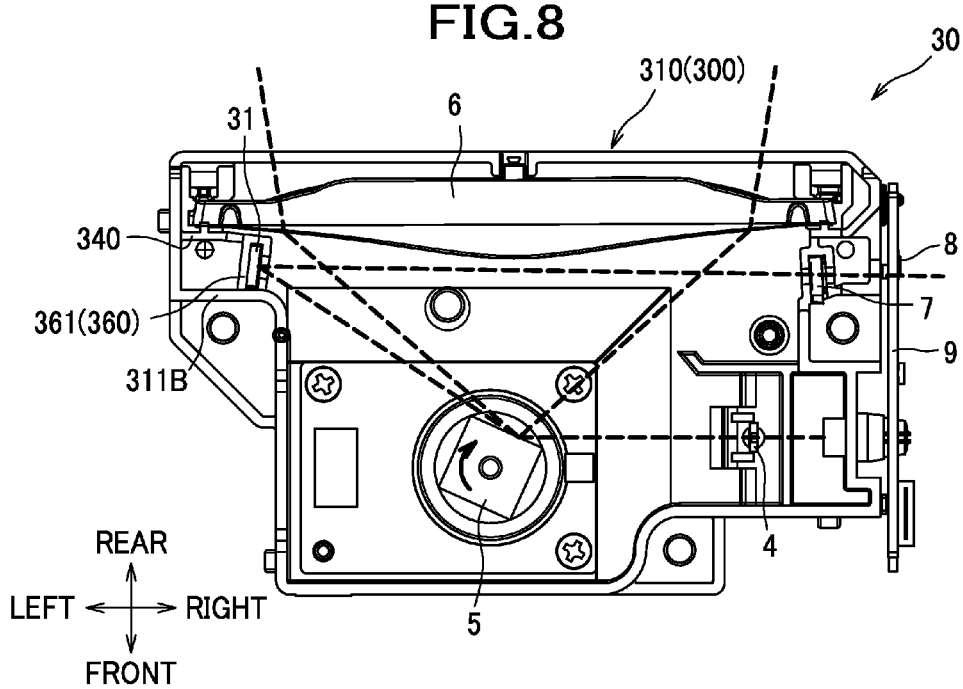
FIG. 8 is a top view of an optical scanning device as implemented according to a third modified embodiment.

In the above-described embodiment, a specific configuration is illustrated such that a light beam reflected off the polygon mirror 5 is directed to directly enter the BD lens 7. Alternatively, the present invention may be embodied as in an optical scanning device 30 further including a BD reflecting mirror 31 as an example of a second optical element. Such an alternative configuration is illustrated in FIG. 8.

In this embodiment, a lower frame 310 includes a fourth retaining wall 360 as an example of a third wall, in place of the reinforcing wall 150 of the above-described embodiment.

The fourth retaining wall 360 is connected to a left first retaining wall 340, and configured to include a holding portion 361 shaped substantially like a letter C which opens in a substantially rightward direction.

The holding portion 361 is configured to have its front end portion connected to a second left exterior wall 311B. The holding portion 361 is holding the BD reflecting mirror 31.

Since the BD reflecting mirror 31 is supported in position by the fourth retaining wall 360 as described above, the BD reflecting mirror 31 is located in an appropriate position, so that the BD reflecting mirror 31 can receive from the polygon mirror 5 and reflect a light beam toward the BD lens 7. With this configuration as well, the BD reflecting mirror 31 can be supported by the fourth retaining wall 360, and thus the structure of the scanner frame 300 can be simplified.

Fourth Modified Embodiment

Figure 9A:
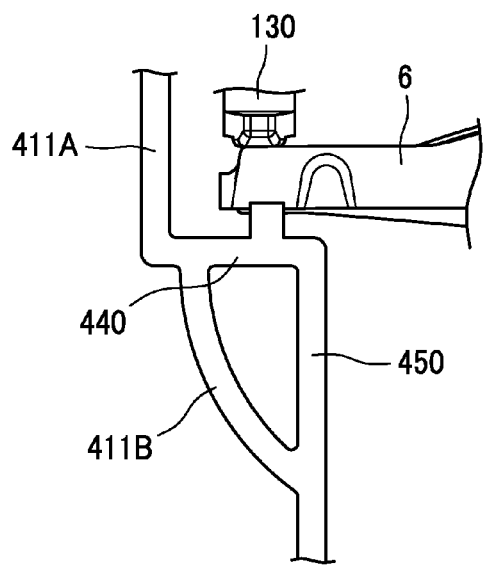
FIG. 9A is an enlarged view showing a structure of a left first wall and its surroundings of an optical scanning device as implemented according to a fourth modified embodiment.

In the above-described embodiment, a specific configuration is illustrated such that the second left exterior wall 111B (fourth wall) is configured to connect the first left exterior wall 111A (second wall) to the reinforcing force 150 (third wall), but the present invention is not limited to this specific configuration. For example, as shown in FIG. 9A, an alternative configuration may be feasible such that a second left exterior wall 411B as an example of the fourth wall is configured to connect a first retaining wall 440 as an example of the first wall to a reinforcing wall 450 as an example of the third wall. With this configuration as well, the first retaining wall 440 can be enhanced in rigidity by the first left exterior wall 411A as an example of the second wall, the reinforcing wall 450 as an example of the third wall, and the second left exterior wall 411B as an example of the fourth wall.

Fifth Modified Embodiment

Figure 9B:
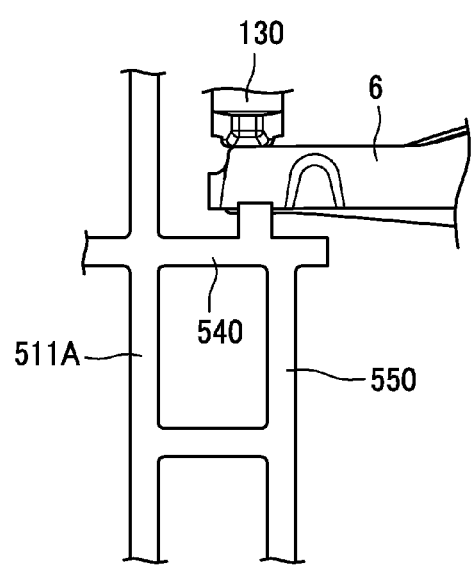
FIG. 9B is an enlarged view showing a structure, corresponding to FIG. 9A, of an optical scanning device as implemented according to a fifth modified embodiment.

In the above-described embodiment, the first left exterior wall 111A is connected to one end of the first retaining wall 140 and the reinforcing wall 150 is connected to the other end of the first retaining wall 140, but the present invention is not limited to this specific configuration. Various other configurations may be applicable, for example, as shown in FIG. 9B, wherein a second-wall connecting position (the position to which a first left exterior wall 511A as an example of the second wall is connected) and a third-wall connecting position (the position to which a reinforcing wall 550 as an example of the third wall is connected) of the first retaining wall 540 as an example of the first wall are in the positions other than the ends of the first retaining wall 540. With this configuration as well, the first retaining wall 540 can be enhanced in rigidity by the first left exterior wall 511A and the reinforcing wall 550 with or without any other additional structure.

Sixth Modified Embodiment

Figure 9C:
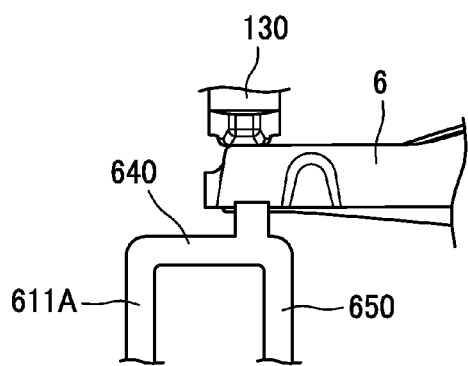
FIG. 9C is an enlarged view showing a structure, corresponding to FIG. 9A, of an optical scanning device as implemented according to a sixth modified embodiment.

In the above-described embodiment, each of the left exterior wall 111A and the seventh right exterior wall 113G (second wall) is configured to extend to the rear side (optical element side) of the first retaining wall 140 that is one of two sides of the first retaining wall 140 on which the f-theta lens 6 is located, but the present invention is not limited to this specific configuration. Alternatively, as shown in FIG. 9C, a first left exterior wall 611A as an example of the second wall may be configured to extend only to the frong side, i.e., in a direction opposite to (facing away from) the optical element side that is one of two sides of a first retaining wall 640 on which the f-theta lens 6 is located. With this configuration as well, the first retaining wall 640 as an example of the first wall can be enhanced in rigidity by the first left exterior wall 611A (second wall) and a reinforcing wall 650 (third wall).

In the above-described embodiment, each first retaining wall 140 is configured to have its abutting portion 141 brought into contact with the f-theta lens 6, but the present invention is not limited to this specific configuration. For example, the first retaining wall 140 may be configured to have its entire surface brought into contact with the f-theta lens 6.

In the above-described embodiment, the polygon mirror 5 is adopted as an example of a deflector, but the present invention is not limited thereto; for example, a vibration mirror may be used instead.

What is claimed is:
1. An optical scanning device comprising:
a light source;
a deflector configured to deflect a light beam derived from light of the light source in a main scanning direction;

a scanning optical system configured to cause the light beam deflected by the deflector to be focused on a target surface to form an image thereon, the scanning optical system including an elongate optical element;

a scanner frame including a lower frame, wherein the lower frame includes a first wall, a second wall, a third wall, and a base wall which supports the deflector and on which the first, second and third walls are provided, the first wall contacting the optical element, the second wall being connected to a second-wall connecting position of the first wall, the third wall being connected to a third-wall connecting position of the first wall; and a biasing member having a first end contacting the optical element and a second end supported by the scanner frame, the biasing member pressing the optical element against the first wall, wherein the second wall extends in a traverse direction angled with respect to a direction in which the first wall extends, the third wall extends in a direction facing away from an optical element side of the first wall that is one of two sides of the first wall on which the optical element is located, and the optical element is in contact with at least one position of the first wall which position is between the second-wall connecting position and the third-wall connecting position.

2. The optical scanning device according to claim 1, wherein the lower frame further includes a fourth wall which connects at least one of the first wall and the second wall to the third wall.

3. The optical scanning device according to claim 2, wherein the fourth wall is apart from the first wall.

4. The optical scanning device according to claim 2, wherein the second and fourth walls are configured to constitute an exterior wall of the lower frame.

5. The optical scanning device according to claim 1, further comprising a photosensor configured to receive the light beam deflected by the deflector to produce a detection signal, and a second optical element configured to direct the light beam to the photosensor, wherein the second optical element is supported by the third wall.

6. The optical scanning device according to claim 1, further comprising a coupling lens configured to convert light emitted from the light source into the light beam to be received by the deflector, wherein the scanner frame further includes a partition wall placed between the light source and the coupling lens while allowing the light to reach the coupling lens.

7. The optical scanning device according to claim 6, wherein an exterior wall of the lower frame has an opening at a position where a line extending from the light source through the coupling lens intersects with the exterior wall.

8. The optical scanning device according to claim 6, wherein the lower frame has a groove configured to receive an adhesive with which the coupling lens is fixed.

9. The optical scanning device according to claim 1, wherein the light source includes a terminal connected to a circuit board, and the scanner frame further includes an upper frame, and wherein the upper frame includes a cover part with which the terminal is covered.

10. The optical scanning device according to claim 1, wherein the optical element includes a first end portion and a second end portion located at two ends thereof in a longitudinal direction thereof, respectively, and the first wall includes two separate portions of which one is disposed adjacent to and in contact with the first end portion of the optical element and the other is disposed adjacent to and in contact with the second end portion of the optical element, and wherein the lower frame further includes a first fixing portion and a second fixing portion which are portions at which the lower frame is fixed to a body frame of an image forming apparatus to which the optical scanning device is installed, the first fixing portion being located in a position closer to the first end portion in the longitudinal direction, the second fixing portion being located in a position closer to the second end portion in the longitudinal direction, and a distance from the first fixing portion to said one portion of the first wall adjacent to the first end portion is substantially equal to a distance from the second fixing portion to said other portion of the first wall adjacent to the second end portion.

11. An optical scanning device comprising:
a light source;
a deflector;
an elongate optical element; and
a lower frame including:
a first wall contacting the optical element;
a second wall connected to a second-wall connecting position of the first wall, the second wall extending in a traverse direction angled with respect to a direction in which the first wall extends,
a third wall connected to a third-wall connecting position of the first wall, the third wall extending in a direction facing away from an optical element side of the first wall that is one of two sides of the first wall on which the optical element is located, and
a base wall which supports the deflector, and on which the first, second and third walls are provided, wherein the optical element is in contact with at least one position of the first wall which position is between the second-wall connecting position and the third-wall connecting position.

12. The optical scanning device according to claim 11, wherein the lower frame further includes a fourth wall which connects at least one of the first wall and the second wall to the third wall.

13. The optical scanning device according to claim 11, wherein the fourth wall is apart from the first wall.

14. The optical scanning device according to claim 12, wherein the second and fourth walls are configured to constitute an exterior wall of the lower frame.

15. The optical scanning device according to claim 11, further comprising a photosensor, and a second optical element for directing the light beam to the photosensor, wherein the second optical element is supported by the third wall.

16. The optical scanning device according to claim 11, further comprising a coupling lens, wherein the scanner frame further includes a partition wall placed between the light source and the coupling lens while allowing the light to reach the coupling lens.

17. The optical scanning device according to claim 16, wherein an exterior wall of the lower frame has an opening at a position where a line extending from the light source through the coupling lens intersects with the exterior wall.

18. The optical scanning device according to claim 16, wherein the lower frame has a groove for receiving an adhesive with which the coupling lens is fixed.

19. The optical scanning device according to claim 11, further comprising an upper frame, wherein the light source includes a terminal connected to a circuit board, and the upper frame includes a cover part with which the terminal is covered.

\* \* \* \* \*